(12) United States Patent
Cobrinik et al.

(10) Patent No.: US 7,689,496 B1
(45) Date of Patent: Mar. 30, 2010

(54) SYSTEM AND METHOD FOR PROVIDING AN IMPROVED FINANCIAL DERIVATIVE PRODUCT

(75) Inventors: Zachariah Cobrinik, New York, NY (US); Theodore Logan, New York, NY (US)

(73) Assignee: Goldman Sachs & Co., New York, NY (US)

( * ) Notice: Subject to any disclaimer, the term of this patent is extended or adjusted under 35 U.S.C. 154(b) by 2522 days.

(21) Appl. No.: 09/823,353

(22) Filed: Mar. 30, 2001

(51) Int. Cl.
  *G06Q 40/00* (2006.01)
(52) U.S. Cl. .......................................... 705/37; 705/38
(58) Field of Classification Search .............. 705/35–38
  See application file for complete search history.

(56) References Cited

U.S. PATENT DOCUMENTS

| | | | |
|---|---|---|---|
| 6,263,321 B1 * | 7/2001 | Daughtery, III | 705/36 R |
| 7,103,569 B1 * | 9/2006 | Groveman et al. | 705/35 |
| 2002/0103852 A1 * | 8/2002 | Pushka | 709/203 |
| 2003/0018558 A1 * | 1/2003 | Heffner et al. | 705/37 |
| 2003/0074293 A1 * | 4/2003 | Kiron et al. | 705/36 |

\* cited by examiner

*Primary Examiner*—Thu Thao Havan
(74) *Attorney, Agent, or Firm*—Walter G. Hanchuk; Chadbourne & Parke LLP (57) ABSTRACT

New and improved methods and systems for creating collared option financial hedge products enable multiple customers to pool their assets into a single product. In contrast the prior art where such products were 'tailor-made' to individual investors, demand is collected across multiple investors and one or more collared option financial hedge products are created. Multiple customers are then permitted to participate in each product. Such hedge products are thus more readily available to a larger group of customers.

22 Claims, 6 Drawing Sheets

| PRODUCT IDENTIFIER | STOCK | TERMS | SUBSCRIPTION OPEN DATE | SUBSCRIPTION CLOSE DATE | PARTICIPANTS |
|---|---|---|---|---|---|
| ABC HEDGE I | ABC | PRODUCT TERMS | 01/01/2001 | 01/31/2001 | LIST OF PARTICIPANTS |
| ABC HEDGE II | ABC | PRODUCT TERMS | 01/01/2001 | 01/15/2001 | LIST OF PARTICIPANTS |
| DEF HEDGE I | DEF | PRODUCT TERMS | 03/01/2001 | 03/15/2001 | LIST OF PARTICIPANTS |
| DEF HEDGE II | DEF | PRODUCT TERMS | 03/01/2001 | 04/01/2001 | LIST OF PARTICIPANTS |

DERIVATIVE PRODUCT DATABASE 30

CUSTOMER DATABASE 40

| CUSTOMER IDENTIFIER | CUSTOMER NAME & ADDRESS INFORMATION | DERIVATIVE PRODUCT IDENTIFIER | STOCK POSITION | STOCK INFORMATION | FEE INFORMATION |
|---|---|---|---|---|---|
| 1234 | JOHN SMITH | ABC HEDGE I | 250,000 SHARES | INFORMATION ON OWNERSHIP RIGHTS IN STOCK | FEE TO CUSTOMER |
| 2345 | JANE ABLE | ABC HEDGE II | 500,000 SHARES | INFORMATION ON OWNERSHIP RIGHTS IN STOCK | FEE TO CUSTOMER |
| 3456 | TOM JAMES | DEF HEDGE I | 400,000 SHARES | INFORMATION ON OWNERSHIP RIGHTS IN STOCK | FEE TO CUSTOMER |
| 4567 | BETTY JONES | DEF HEDGE II | 750,000 SHARES | INFORMATION ON OWNERSHIP RIGHTS IN STOCK | FEE TO CUSTOMER |

SYSTEM AND METHOD FOR PROVIDING AN IMPROVED FINANCIAL DERIVATIVE PRODUCT

FIELD OF THE INVENTION

The present invention relates generally to a system and method for providing a financial investment product and more particularly to a system and method for providing an improved financial derivative product.

BACKGROUND OF THE INVENTION

There are several well-recognized situations in which an investor may own, or be "long" in, a substantial, highly valued quantity of a single stock, also known as a concentrated equity position, yet be unable or unwilling to sell that stock for a lengthy period of time.

Investors may develop a concentrated equity position, for example, through the long-term bullish performance of an investment. The position may be acquired through an inheritance or the receipt of a gift of a large quantity of a single stock. Employees may come into the position through the receipt of appreciating stock options or through a merger or acquisition event where there is a stock-for-stock payout.

A concentrated equity position may be illiquid, for example, because the stock is unregistered or its sale is regulated or contractually restricted. Tax liabilities may discourage a stock sale.

An investor in a concentrated, illiquid equity position runs the substantial risk that the value of the stock will diminish before his position becomes liquid. If the value of the stock drops before an investor is able or willing to sell the stock, a substantial amount of money may be lost. Hedging strategies based on the sales and/or purchases of stock derivatives are a recognized way of minimizing the risk associated with an illiquid stock position. A purchased, or "long", put option minimizes an investor's downside risk by providing a floor, or put "strike price", at which the investor may sell the stock until the put option's "expiration date". Combined with a long stock position, the purchase of a put option limits an investor's downside risk per share to the put strike price less the put option cost.

Call options are another common stock derivative providing the right to buy a stock (for the buyer of the option) or the obligation to sell a stock (for the seller of the option) at a call strike price through an expiration date. While the purchase of call options is a common strategy for investors, what is of particular interest with respect to the present invention is the sale of a call option by the hypothetical, illiquid investor described above. When an investor owns the underlying stock for which the call option is being sold, the call option is said to be "covered." Covered call options minimize the option seller's downside risk because the owned stock can be liquidated to cover the exercise of the call option by the buyer. Alternatively, the call option may be covered with cash. Covered call options, however, limit the call option seller's upside. If, in fact, the value of the underlying stock rises, the call option seller is obligated to sell the stock to the call option buyer, on or before the call option expiration date, at the call strike price.

Revisiting again the situation of the concentrated equity, illiquid investor, this investor may desire to purchase put options in order to minimize the downside risk during the period that the stock is not liquid. However, exchange-listed put options are both expensive and also relatively short in duration. Exchange-listed put options, as traded on the open market, have expiration dates no longer than about six months forward of the purchase date. The further out the expiration date, the more expensive the put options become. Customized, long-term put options are available at substantial cost to hedge concentrated, long-term equity positions. They are, however, prohibitively expensive. They are also generally only available to high-net-worth individuals hedging a substantial quantity of stock.

One way of paying the cost of a put option is to simultaneously sell a call option, in this case a covered call option as described above. This hedge strategy, simultaneously purchasing a put option while selling a covered call option, is termed a "collar." It will be understood that the put options in a collared option position limits the downside risk to the equity holder, while the cost of the put option may be covered through the sale of the call option. Generally, for the same time periods, the income from a call option at 1.48 times the current underlying stock price equals the cost of a put option. at 0.95 times the current underlying stock price.

It will be understood that, just as a put option limits the downside of an underlying stock position to the strike price of the put option, the sale of or obligation of a call option limits the upside of the underlying stock position to the strike price of the call option. The stock, or equivalent cash, must be delivered by the seller of a call option if the actual stock price exceeds the call option strike price before the call option expiration date. This is, however, an acceptable risk to an investor holding an illiquid, concentrated equity position. Such an investor is typically more concerned with losing real current value than surrendering any potential increase in value.

Given an understanding of a collared option hedge strategy, the hedge position is difficult if not impossible to purchase for a high-value, high-concentration equity position as a standard product. Due to the typical long-term position of the high-value, concentrated equity holder, collars for such investors are typically available only as special-purpose products through financial service firms. It will be appreciated that, given the right pricing model, a collared option hedge position can be a profitable product for a seller. However, such products require a substantial amount of labor to both create and to manage for profit. It will be understood that, given the right pricing structure and active management of a bank's position in the hedged stock, a collared option product can be a profitable financial product for a bank. In fact, many banks offer such products. However, the set-up and management of such products is complex and expensive.

Because of the complex nature of creating and managing a collared option hedge product, sellers of this type of product will only sell them to concentrated equity investors holding a very high value of stock. Further, because of the risk that the investor may have to pay cash to cover a call option should the underlying stock continue to be illiquid for an extended period of time, such products are typically only available to high-net-worth individuals.

Accordingly, it would be desirable to provide a collared option hedge product that is more affordable to and readily available to investors than those products currently available today.

With the prolific spread of retail trading systems and the long-term bullish outlook of the market, there are many more investors today than have existed in the past. For example, stock options have become a standard form of employee compensation, making many more high-concentration equity investors than have been typical in the past. Affordable, available stock trading systems have increased the 'ordinary' family's investment in the market, increasing the likelihood of concentrated equity positions to those who may not have even traded stocks some decades ago. In the 'new' investment environment, a smaller concentrated equity position may still constitute a substantial quantity of the wealth of the owner.

Under the current state of the business, collared option hedge products are generally too expensive or otherwise not available to these 'new' investors. The present inventors have determined that making collared option hedge products more available would be beneficial to the investors and could be done in a manner profitable to the provider of the products themselves.

SUMMARY OF THE INVENTION

In accordance with the present invention there is provided new and improved systems and methods that enable concentrated-position equity holders to pool their assets for participation in a financial derivative product.

More particularly, there are provided systems and methods for establishing and facilitating collared option financial hedge products each having multiple participants.

In one embodiment of the invention there is provided a system and a method for establishing a derivative financial product, the method comprising the steps of: storing on a computer information defining a collared option hedge product for a selected stock; collecting demand for the collared option hedge product from a plurality of potential customers; allocating the collected demand for the collared option hedge product amongst a plurality of customers; and storing the allocated demand on the computer.

In accordance with another embodiment of the invention, there is provided a system and method for establishing a derivative financial product, the system comprising the steps of: collecting preliminary demand information for a collared option hedge product for a stock from a plurality of potential customers; creating, based on the step of collecting preliminary demand information, the collared option hedge product having product features accommodating a plurality of customers; and storing the product features for the at least one collared option hedge product on the computer.

In accordance with yet another embodiment of the invention, there is provided a system and method of investing in a derivative financial product, the system comprising the steps of: receiving information defining a collared option hedge product for a selected stock; requesting participation in the collared option hedge product for a desired quantity of stock; receiving authorization to participate in the collared option hedge product with other investors for an allocated quantity of stock; and accepting the authorization.

BRIEF DESCRIPTION OF THE DRAWINGS

These and other objects, features and advantages of the invention will become apparent from a consideration of the detailed description of the invention when read in conjunction with the drawing figures, in which.

DETAILED DESCRIPTION OF THE INVENTION

Description of a Collared Option Product

Figure 1:
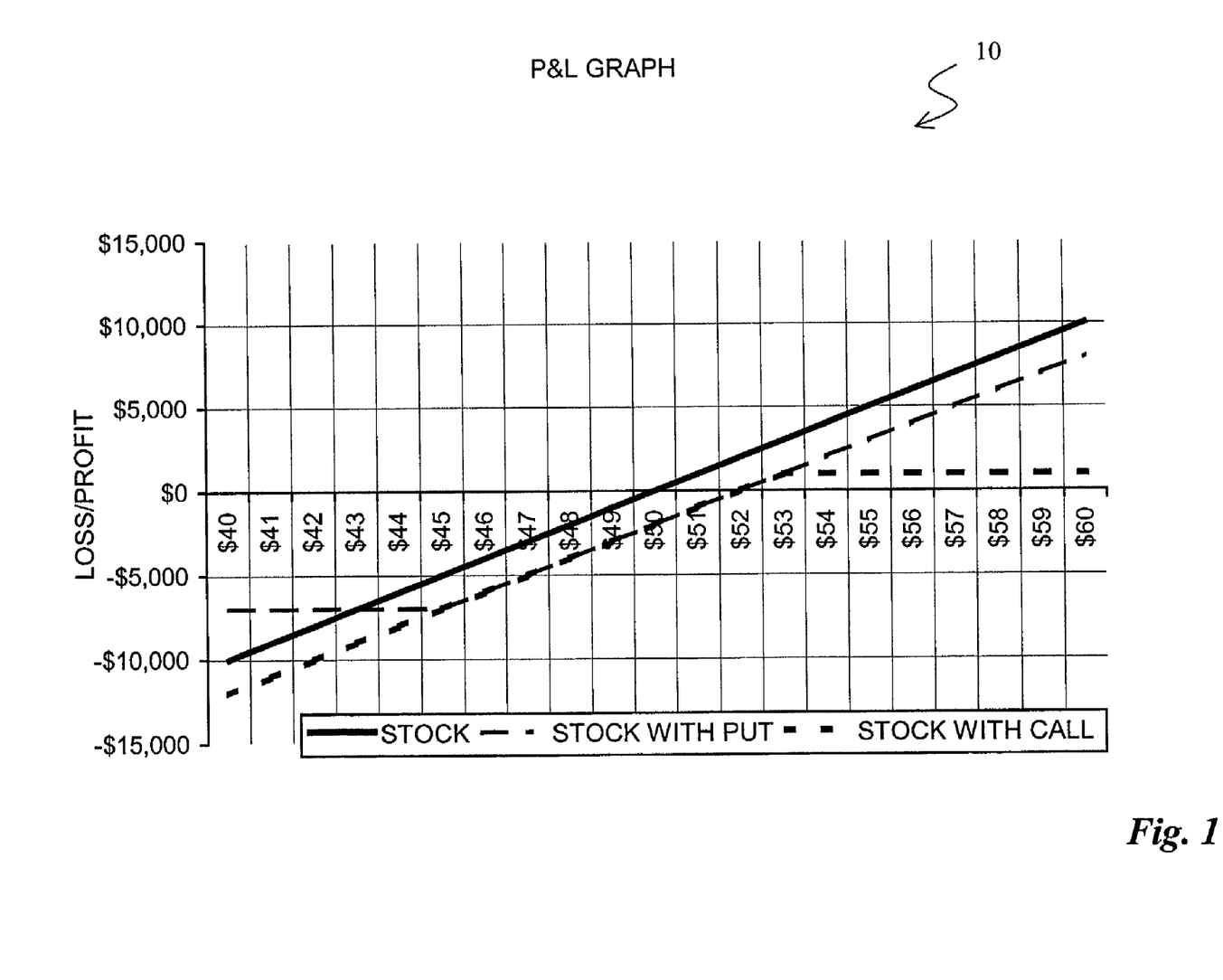
FIG. 1 comprises a chart illustrating a typical covered stock position collared with both put and call options.

With reference now to FIG. 1 there is shown a profit & loss (P&L) graph 10 for an exemplary stock position hedged, or collared, with both an exemplary put option and an exemplary call option.

For purposes of illustration it will be assumed that the owner of the stock was awarded 1,000,000 shares of ABC stock at a strike price of $1.00 per share, for example as compensation. It will be further assumed that the owner of the stock is in a 'lock-up' situation where either federal laws or contractual relationships prohibit him from selling any of the stock. Further for purposes of illustration, it will be assumed that the market position of the stock is currently $50.00 per share. Hence, less the $1.00 strike price, the owner of the stock has a 'paper' value of $49,000,000.00. This is thus an example of the highly concentrated, illiquid stock position described above.

Examining now the P&L graph 10 of FIG. 1, it will be seen that the solid line labeled "stock" represents a P&L position for a holder of one million (1,000,000) shares of ABC stock having a current market value of $50.00 per share. The profit/loss dollar figures on the Y-axis are thus in thousands of dollars. Hence, in a straightforward manner well understood to those skilled in the art and for the moment ignoring the derivative products, while the stock remains at $50.00 per share, the P&L graph shows a value of $0.00. That is, the owner has neither made nor lost money or, in our example, the owner has a current illiquid paper worth of $49,000,000.00.

For every dollar the stock declines in value in the market, the P&L graph shows a decrease in value to the owner, or loss, of $1,000,000.00. Conversely, for every dollar the stock increases in value in the market, the P&L graph shows an increase in value to the owner of $1,000,000.00. If, for example, the value of the stock should drop to $1.00 per share, the owner would lose the entirety of his $49,000,000.00 position in the stock. The owner is thus highly motivated to purchase a derivative product that hedges his potential loss in the market.

Examining first the put option, indicated on the graph as the short dotted line, in order to diminish the risk of a downside loss, a put option having a strike price of $45.00 per share has been purchased at a cost of $2.00 per share. Should the price of ABC stock drop below $45/share during the life of the option contract, the put option provides the owner the right to put the stock to the seller of the option at the $45.00/share strike price. Thus, with this put option, the stock owner's total downside risk during the life of the contract is the $5.00 share difference between the market price and strike price (i.e. $50.00−$45.00=$5.00) plus the option cost per share of $2.00 for a total downside risk of a $7,000,000.00 decrease in his current paper worth.

Thus for a cost of $2.00 per option, or $2,000,000.00, the stock owner has significantly capped his downside risk.

However, since ABC stock is illiquid, the $2,000,000.00 cost may be prohibitive. Accordingly, in a collared option hedge product a call option is simultaneously sold to cover or substantially cover the cost of the put option. In the present example, the call option, represented by the short, dotted line, has a strike price of $53.00 per share at a cost of $2.00 per share. The benefit of selling the call option is that the revenue recognized can offset the cost of the previously described put option. One of the detriments is that the upside of the stock owner is now limited to the call strike price of $53.00 per share, less the call cost of $2.00 per share, for an upside cap of $51.00 per share. Another detriment is that the stock owner may receive a call from the call option owner while his position in the stock is illiquid.

Examining the totality of the collared option product described above, it will be seen that given the low strike price and high current market value of the stock, the downside limitations provided by the put option are very significant to the owner while, conversely, the upside limitations are minimal given the paper value already held by the owner. Thus, the cap imposed by the call option is not of great concern relative to the ability to use the revenue from the call option to cover the significant value afforded by the put option. Further, arrangements can be made to pay a call from the call option owner in cash so as to avoid the liquidity issue, or even to defer cash payment in favor of a note having a favorable interest rate payable at such time that the stock trading restrictions are no longer in place.

As described above, while collared options are theoretically available to all investors, practical problems prevent them from being easily acquired by highly concentrated, illiquid stock owners. Most particularly, the average life of an over-the-counter option contract is relatively short, measured in months. A lock-up due to federal regulations or a contractual agreement may last from six months to several years. Further, the sheer cots and complexities of purchasing derivative products of this magnitude discourage individual investors from constructing their own product.

In fact, the complexities associated with creating a collared option product are so great that even financial institutions such as brokerages and investment banks have here-to-for limited the availability of such products to small numbers of highly-concentrated stock owners. In essence, a custom product has been created and sold to selected, individual customers. As will be seen from this detailed description of the invention, the present invention enables investors to pool their options and obtain otherwise difficult or unavailable access to these products.

Description of the System

Figure 2:
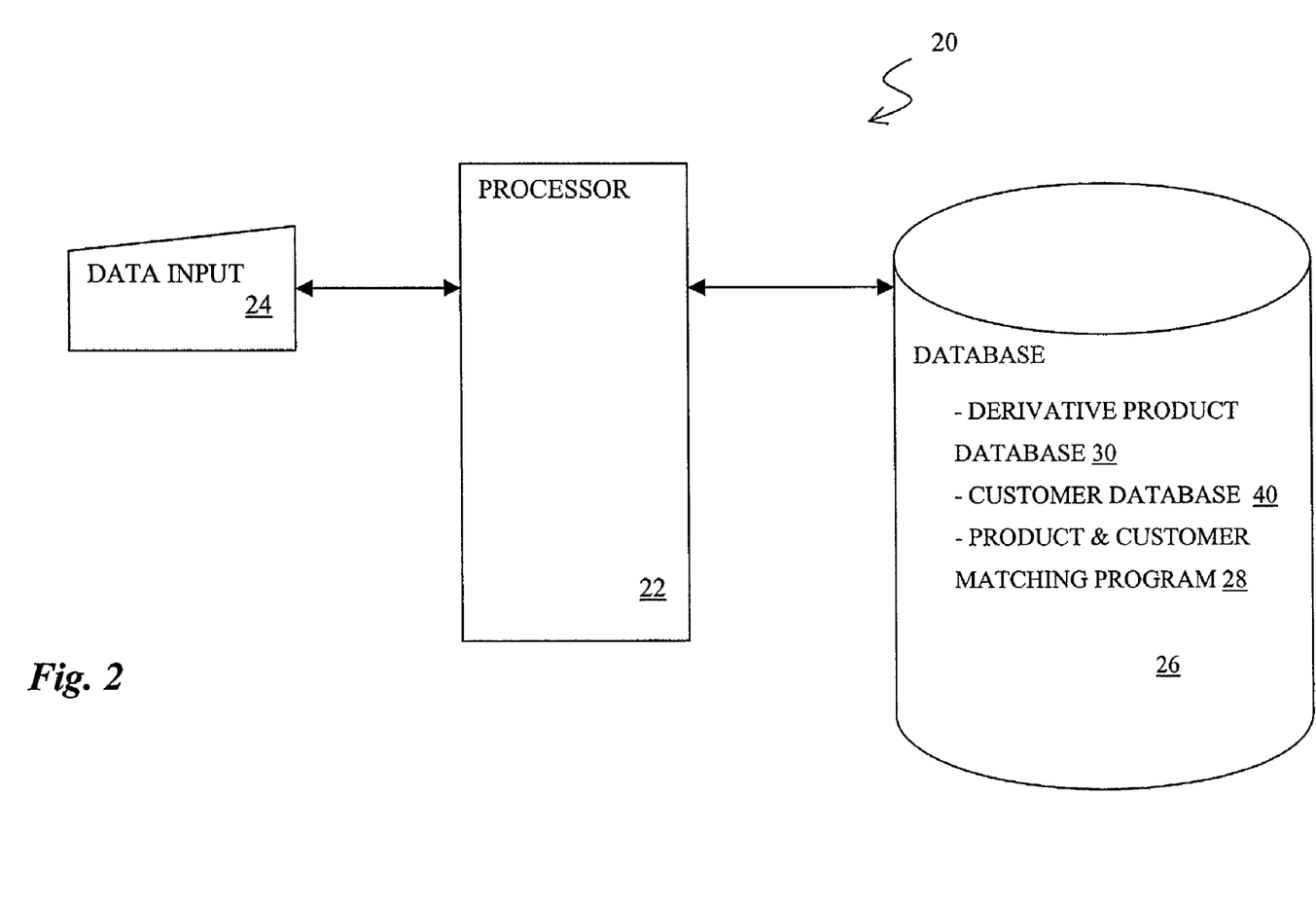
FIG. 2 comprises a block diagram of a computer system configured in accordance with the present invention.

With reference now to FIG. 2, one exemplary computer system 20 is shown that is functional to implement the present invention. Computer system 20 is seen to include a processor 22 connected to a data input/output device 24 and a database 26. Processor 22 comprises a standard computing system such as an Intel™ microprocessor-based system running a Microsoft™ Windows™ operating system. Data input/output device 24 comprises a conventional display terminal and keyboard and database 26 comprises a conventional storage device comprising an appropriate combination of magnetic, optical and semiconductor storage medium. Processor 24 further includes a conventional network connection (not shown) for providing a communications interface to other computing systems.

Database 28 is seen to include a derivative product database 30 for storing data relating to financial hedge products described below, a customer database 40 for storing customer data in a manner described below and a program 28 for matching customers and products. Databases 30 and 40 can be implemented using any commercially available database program, for example Microsoft Access™ or one of the many functionally equivalent programs known in the art. Similarly, a computer implementation of the matching program can be implemented using any conventional programming language, for example C or Fortran, or may be implemented in a conventional spreadsheet, for example Microsoft™ EXCEL™.

Description of the Databases

Figure 3:
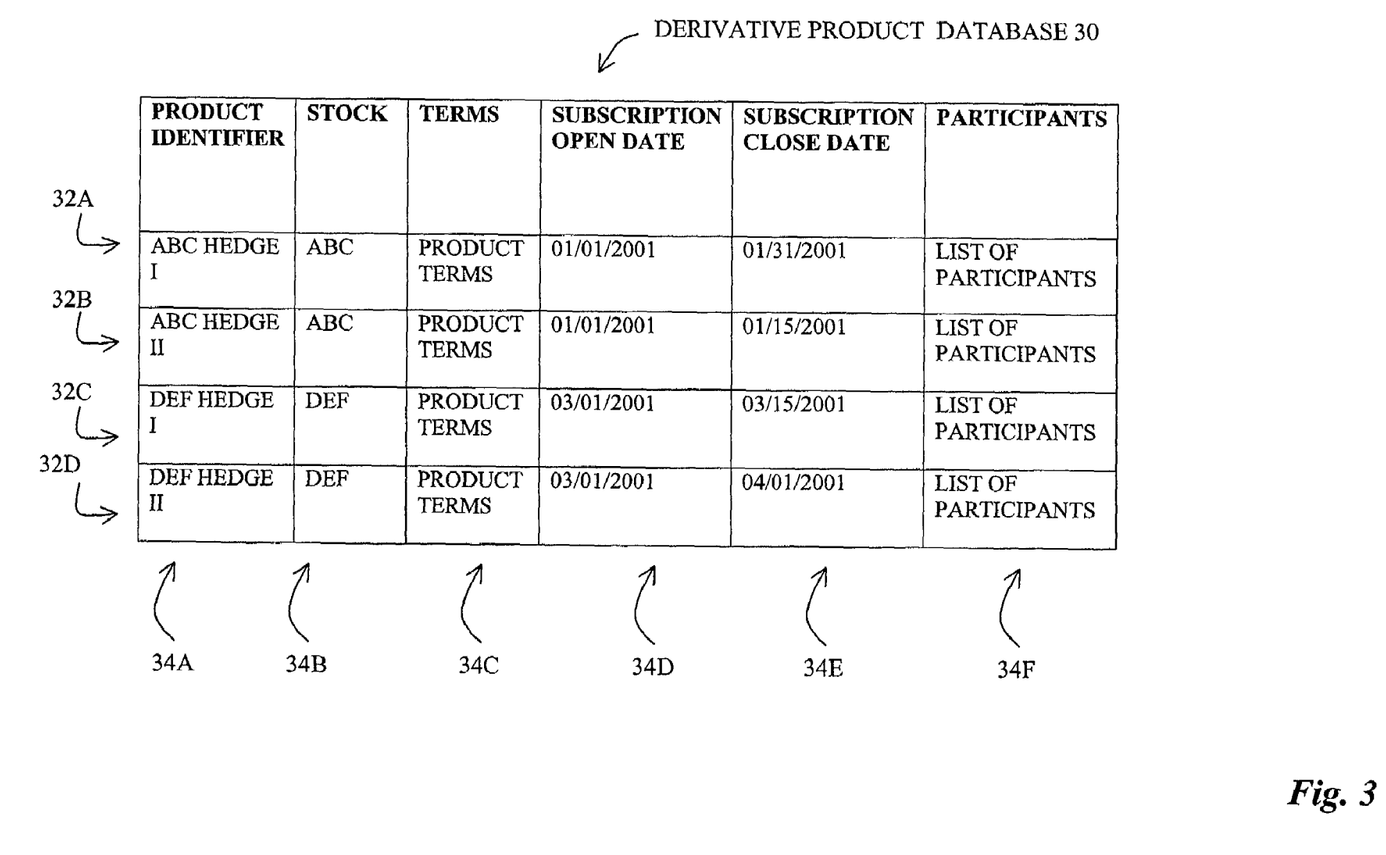
FIG. 3 is a table illustrating one exemplary form of a product database in accordance with the present invention.

With reference now to FIG. 3, there is shown an exemplary implementation of derivative product database 30 including four data records indicated at 32A-D, each containing date regarding a particular financial hedge product, each product being described by the data contained in six fields indicated at 34A-F.

Data record 32A is seen to describe a first collared option hedge product for ABC stock, indicated in product identifier field 34A as "ABC HEDGE I." Data record 32B indicates a second hedge product for holders of ABC stock. Data records 32C and 32D indicate first and second collared option hedge products for holders of DEF stock, respectively.

Data field 34B contains a stock identifier, while data field 34C contains detailed terms and conditions relating to each hedge product. Detailed terms and conditions may include, for example and without limitation, costs and strike prices on put and call options, the time frame of the products and the underlying options, management costs and fees associated with participation in the product and a maximum number of stock shares to be accommodated in a product. Data fields 34D and 34E contain opening and closing subscription dates, respectively, for the corresponding financial hedge products. Data field 34F includes a list of participants participating in each of the various financial hedge products, each list being specific to the corresponding product and being developed in accordance with the processes described below.

Figure 4:
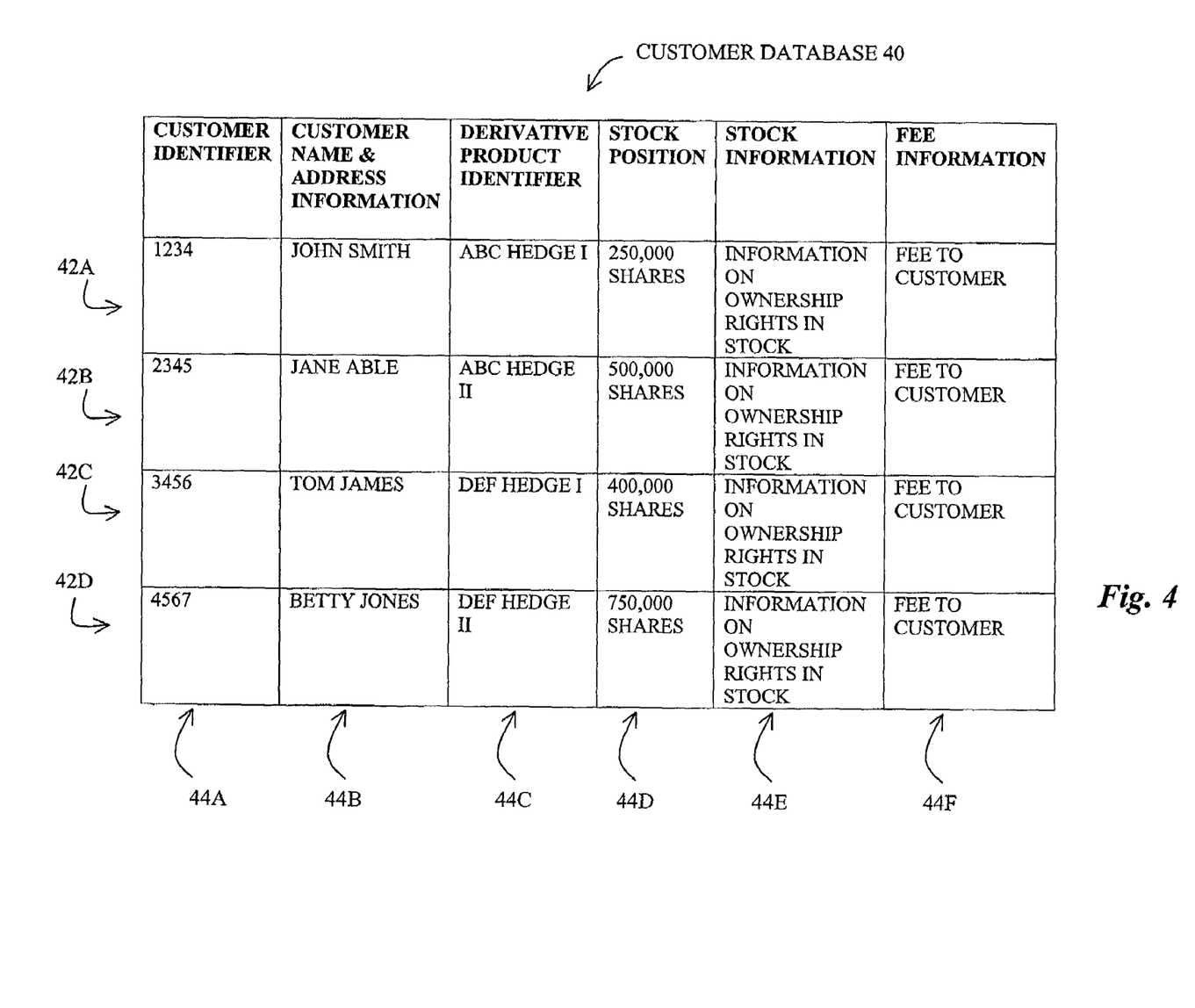
FIG. 4 is a table illustrating one exemplary form of a customer database in accordance with the present invention.

With reference now to FIG. 4, an exemplary implementation of customer database 40 is seen to include four data records, indicated at 42A-D, each record containing data relating to a particular customer. Each data record is seen to contain 6 data fields, the respective data fields indicated at 44-F.

Data field 44A is seen to contain a particular customer identifier, for example an account number, while data field 44B contains additional identifying information such as customer name and address information. Data field 44C contains a product identifier indicating the financial hedge product in which the customer participates, while data field 44D identifies the size of the customer participation by number of shares. Data field 44E contains data describing the particular stock ownership information relevant to each customer, for example including total shares owned, lock-up or other relevant contractual or legal information and any additional information relevant to tracking the customer's participation in the financial hedge product. Data field 44F includes fee information relating to the respective fees charged each customer.

It will be appreciated that the data in customer identifier field 44A of customer database 40 may be used to populate participants field 34F of derivative product database 30, thereby enabling the cross-referencing of the databases. Similarly product identifiers contained in field 34A of derivative product database 30 may be used to populate the product identifier of customer database 40.

It will be understood that numerous other embodiments for the databases, all contemplated by the present invention, will now be apparent to those skilled in the art.

Description of System Operation

The operation of product and program matching software 28 (FIG. 2) will now be described with respect to FIGS. 5 and 6.

Figure 5:
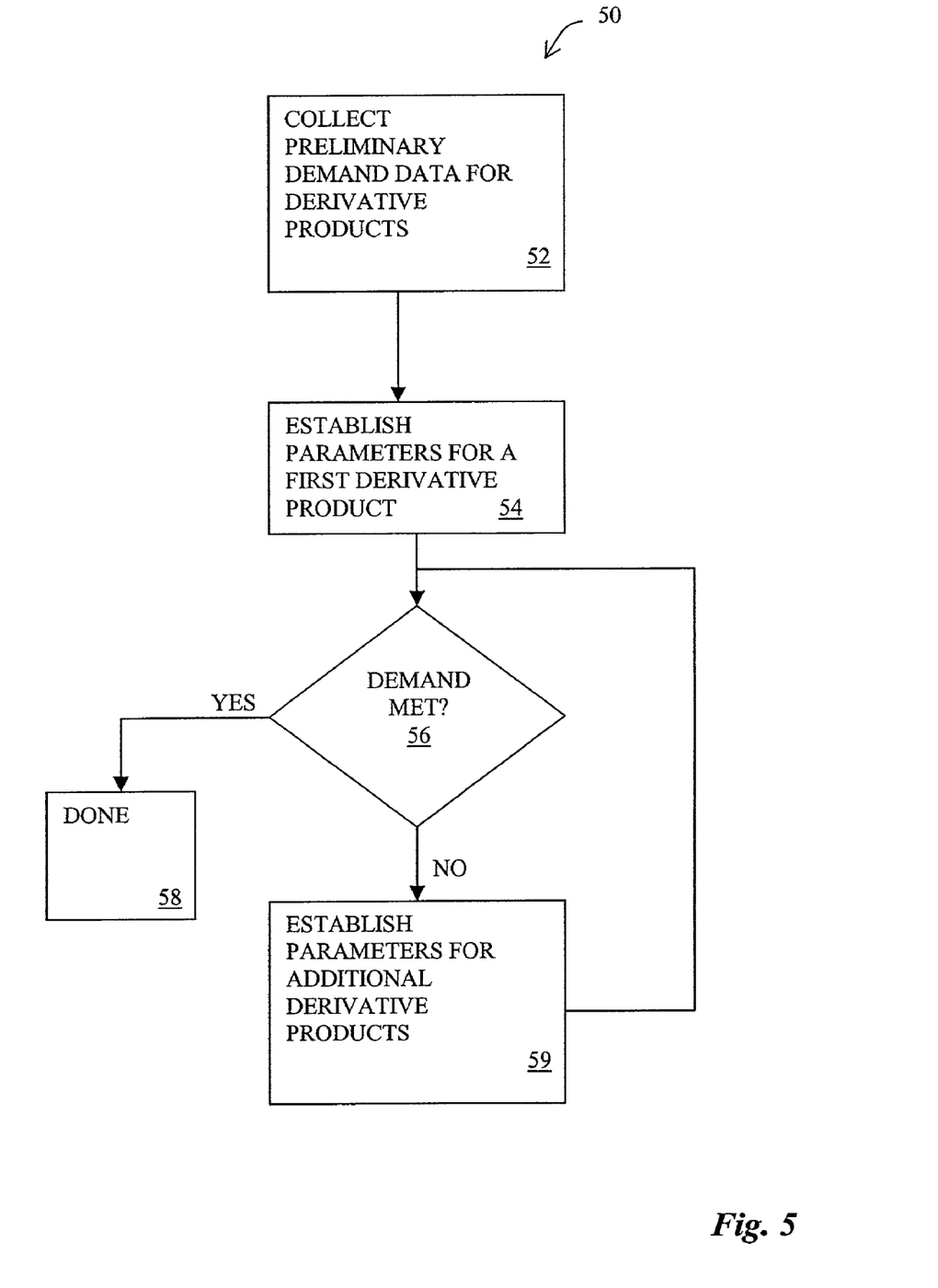
FIG. 5 is a flow chart illustrating a process for establishing one or more derivative products in accordance with the present invention.

With reference to FIG. 5, a process 50 is shown for establishing the terms and conditions of collared option financial hedge products in accordance with the present invention. Initially, demand is collected from multiple potential customers to determine their financial position and their need for relevant products. With reference to customer database 40, this demand data can include information relating to a customer's particular position in a stock, i.e. the number of shares held and information on rights and restrictions.

It will be appreciated that the collection of demand from multiple customers for the purpose of developing a pooled customer product is a significant improvement over the prior art, wherein such products were developed only in a highly-tailored manner for individual customers.

Subsequent to the collection of demand data, parameters are established for a product (step 54), the product designed to accommodate multiple customers. If demand is met (step 56), then the process of creating derivative products in accordance with the present invention ends (step 58). If demand is not met with the current product set, then additional products may be developed (step 59). It will be understood that the invention contemplates the creation of any number of products.

Figure 6:
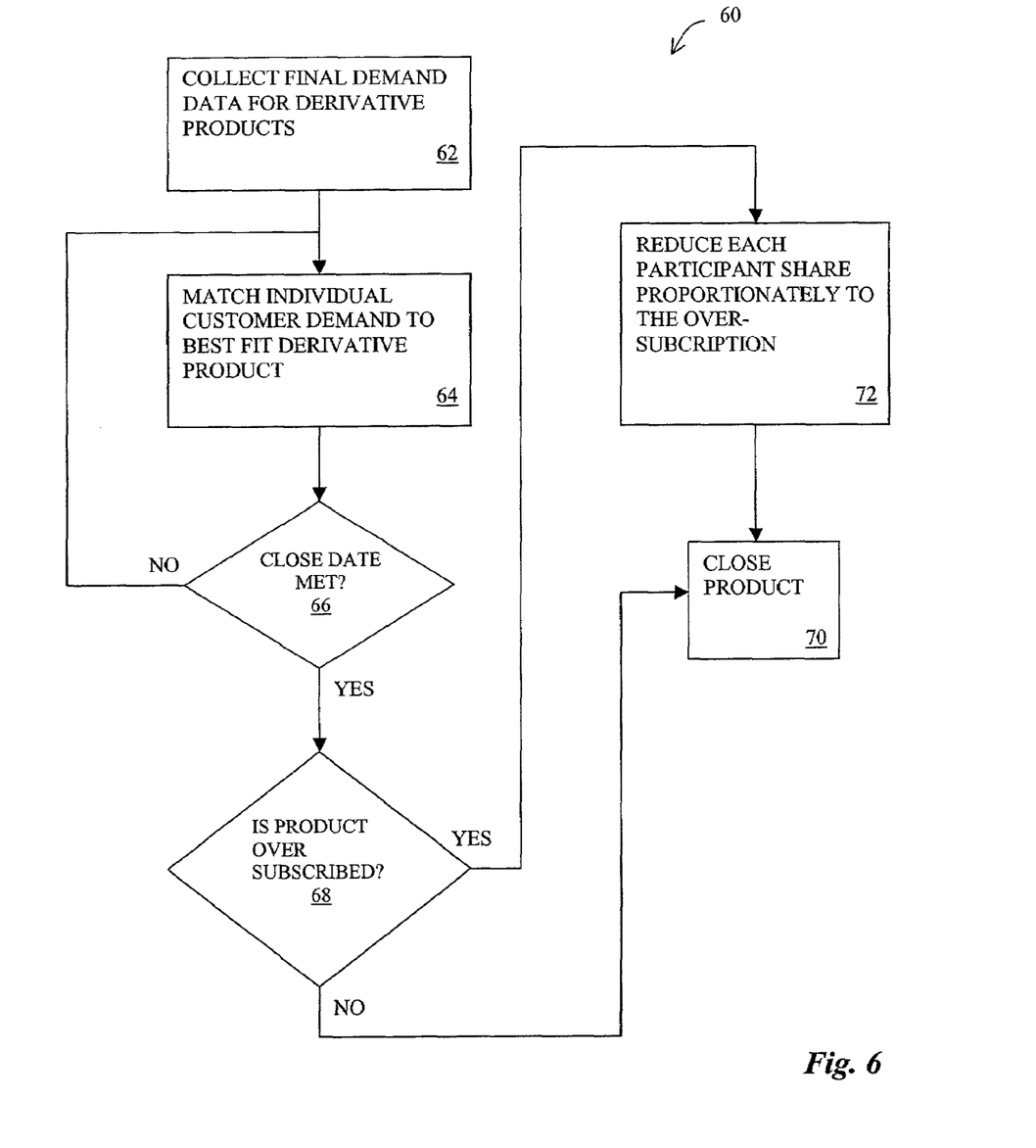
FIG. 6 is a flow chart illustrating a process for allotting the derivative products established in FIG. 5 amongst multiple customers.

With reference now to FIG. 6, there is shown a process 60 for subscribing customers to particular financial products.

Initially, final demand is collected from customers (step 62) to determine if interest or financial position has changed during the creation of the products. Those customers desiring to pool their stock in one or more of the financial products created above are matched with the best product (step 64) until the determined close date for that product is met (step 66).

Continuing with reference to FIG. 6, each product is examined to determine if the participating customers have over-subscribed the product with stock (step 68). If the product is not over-subscribed, then it is closed (step 70). If the product is over-subscribed, then an appropriate action is taken. In the described embodiment of the invention, each customer's participation is reduced proportionately to the percentage of the over-subscription. For example, if the product is over-subscribed by a factor of 10% too much stock, each customer's stock participation is reduced by 10%.

It will be appreciated that many different methodologies for dealing with over-subscription will be apparent to those skilled in the art, for example denying participation to the last-in customer(s).

There has thus been provided new and improved systems for creating and facilitating participation in new and improved financial hedge products, more particularly collared option hedge products that accommodate multiple, pooled investors. The invention has particular application in the financial industries.

Numerous changes, modifications, and improvements falling within the scope of the invention will now occur to those skilled in the art.

What is claimed is:

1. A method operable on a computer for establishing a derivative financial product, comprising the steps of:
    storing on said computer information defining a collared option hedge product for a selected stock;
    collecting demand for said collared option hedge product from a plurality of potential customers;
    allocating the collected demand for said collared option hedge product amongst at least some of the plurality of potential customers; and
    storing the allocated demand on said computer;
    wherein the demand includes, for each of the plurality of potential customers, a quantity of stock of each potential customer for investing in a pool in connection with said collared option hedge product.

2. A method in accordance with claim 1 wherein said collared option hedge product comprises product features including a put option strike price, a call option strike price, an active time period and a maximum quantity of said stock accommodated by said product.

3. A method operable on a computer for establishing a derivative financial product, comprising the steps of:
    storing on said computer information defining a collared option hedge product for a selected stock;
    collecting demand for said collared option hedge product from a plurality of potential customers;
    allocating the collected demand for said collared option hedge product amongst at least some of the plurality of potential customers; and
    storing the allocated demand on said computer:
    wherein the demand includes, for each of the plurality of potential customers, a quantity of stock of each potential customer for investing in a pool in connection with said collared option hedge product;
    wherein said collared option hedge product comprises product features including a put option strike price, a call option strike price, an active time period and a maximum quantity of said stock accommodated by said product;
    further including the step of, if the demand for said collared option hedge product exceeds the maximum quantity of said stock accommodated by said product, allocating the availability of the collared option hedge product in accordance with a predetermined plan.

4. A method in accordance with claim 3 wherein said predetermined plan includes diminishing the requested quantity of stock participation in the collared option hedge product for each of said plurality of potential customers by a percentage equal to the percentage by which total demand exceeds the maximum quantity of stock allocated for the collared option hedge product.

5. A computer system for establishing a derivative financial product, comprising:
    a processor;
    a memory connected to said processor, said memory containing instructions operable by said processor to perform the steps of:
    storing on said computer system information defining a collared option hedge product for a selected stock;
    collecting demand for said collared option hedge product from a plurality of potential customers;
    allocating the collected demand for said collared option hedge product amongst at least some of the plurality of potential customers; and
    storing the allocated demand on said computer system;
    wherein the demand includes, for each of the plurality of potential customers, a quantity of stock of each potential customer for investing in a pool in connection with said collared option hedge product.

6. A system in accordance with claim 5 wherein said collared option hedge product comprises product features including a put option strike price, a call option strike price, an active time period and a maximum quantity of said stock to be accommodated by said product.

7. A computer system for establishing a derivative financial product, comprising:
    a processor;
    a memory connected to said processor, said memory containing instructions operable by said processor to perform the steps of:
    storing on said computer system information defining a collared option hedge product for a selected stock;

collecting demand for said collared option hedge product from a plurality of potential customers;

allocating the collected demand for said collared option hedge product amongst at least some of the plurality of potential customers; and storing the allocated demand on said computer system;

wherein the demand includes, for each of the plurality of potential customers, a quantity of stock of each potential customer for investing in a pool in connection with said collared option hedge product;

wherein said collared option hedge product comprises product features including a put option strike price, a call option strike price, an active time period and a maximum quantity of said stock to be accommodated by said product;

further including the step of, if the demand for said collared option hedge product exceeds the maximum quantity of said stock accommodated by said product, allocating the availability of the collared option hedge product in accordance with a predetermined plan.

8. A system in accordance with claim 7 wherein said predetermined plan includes diminishing the requested quantity of stock participation in the collared option hedge product for each of said plurality of potential customers by a percentage equal to the percentage by which total demand exceeds the maximum quantity of stock allocated for the collared option hedge product.

9. A method for establishing a derivative financial product, comprising the steps of:

storing information defining a collared option hedge product for a selected stock; collecting demand for said collared option hedge product from a plurality of potential customers;

allocating the collected demand for said collared option hedge product amongst at least some of the plurality of potential customers; and storing the allocated demand;

wherein the demand includes, for each of the plurality of potential customers, a quantity of stock of each potential customer for investing in a pool in connection with said collared option hedge product.

10. A system for establishing a derivative financial product, comprising:

means for storing information defining a collared option hedge product for a selected stock;

means for collecting demand for said collared option hedge product from a plurality of potential customers;

means for allocating the collected demand for said collared option hedge product amongst at least some of the plurality of potential customers; and means for storing the allocated demand;

wherein the demand includes, for each of the plurality of potential customers, a quantity of stock of each potential customer for investing in a pool in connection with said collared option hedge product.

11. A program product containing a program operable on a computer for establishing a derivative financial product, said program product comprising instructions for operating said computer to perform the steps of:

storing on said computer information defining a collared option hedge product for a selected stock;

collecting demand for said collared option hedge product from a plurality of potential customers;

allocating the collected demand for said collared option hedge product amongst at least some of the plurality of potential customers; and storing the allocated demand on said computer;

wherein the demand includes, for each of the plurality of potential customers, a quantity of stock of each potential customer for investing in a pool in connection with said collared option hedge product.

12. A method operable on a computer for establishing a plurality of derivative financial products, comprising the steps of:

storing on said computer information defining a plurality of collared option hedge products for a selected stock, each of said collared option hedge products comprising product features including a put option strike price, a call option strike price, an active time period and a maximum quantity of said selected stock to be accommodated by said product;

collecting demand for said plurality of collared option hedge products from a plurality of potential customers, said demand including desired product characteristics including a desired put option strike price, a desired call option strike price and a desired time period for said collared option hedge product;

matching said desired product characteristics of said demand with said product features of said collared option hedge products;

allocating, based on said matching step, the collected demand among the plurality of collared option hedge products, including allocating at least some of the plurality of potential customers to each of said plurality of collared option hedge products; and storing the allocation from said allocating step on said computer;

wherein the demand includes, for each of the plurality of potential customers, a quantity of stock of each potential customer for investing in a pool in connection with said collared option hedge product.

13. A method in accordance with claim 12 and further including the steps of:

storing on said computer for each of said plurality of collared option hedge products a close date for allocating demand to said product; and closing, upon the occurrence of a close date, access to a collared option hedge product.

14. A method in accordance with claim 12 and further including the step of, if the demand for a collared option hedge product exceeds the maximum quantity of said selected stock for said product, allocating the availability of the collared option hedge product in accordance with a predetermined plan.

15. A method in accordance with claim 14 wherein said predetermined plan includes diminishing the requested quantity of stock participation in the collared option hedge product for each potential customer by a percentage equal to the percentage by which total demand exceeds the maximum quantity of stock allocated for the collared option hedge product.

16. A computer system for establishing a plurality of derivative financial products, comprising:

a processor;

a memory connected to said processor, said memory storing instructions for controlling the operation of said computer system to perform the steps of:

storing on said computer system information defining a plurality of collared option hedge products for a selected stock, each of said collared option hedge products comprising product features including a put option strike price, a call option strike price, an active time period and a maximum quantity of said selected stock to be sold for said product;

collecting demand for said plurality of collared option hedge products from a plurality of potential customers, said demand including desired product characteristics including a desired put option strike price, a desired call option strike price and a desired time period for said collared option hedge product;

matching said desired product characteristics of said demand with said product features of said collared option hedge products;

allocating, based on said matching step, the collected demand among the plurality of collared option hedge products, including allocating at least some of the plurality of potential customers to each of said plurality of collared option hedge products; and storing the allocation from said allocating step on said computer;

wherein the demand includes, for each of the plurality of potential customers, a quantity of stock of each potential customer for investing in a pool in connection with said collared option hedge product.

17. A system in accordance with claim 16 and further including the steps of:

storing on said computer for each of said plurality of collared option hedge products a close date for allocating demand to said product; and closing, upon the occurrence of a close date, access to a collared option hedge product.

18. A system in accordance with claim 16 and further including the step of, if the demand for a collared option hedge product exceeds the maximum quantity of said selected stock for said product, allocating the availability of the collared option hedge product in accordance with a predetermined plan.

19. A system in accordance with claim 18 wherein said predetermined plan includes diminishing the requested quantity of stock participation in the collared option hedge product for each potential customer by a percentage equal to the percentage by which total demand exceeds the maximum quantity of stock allocated for the collared option hedge product.

20. A method for establishing a plurality of derivative financial products, comprising the steps of:

storing information defining a plurality of collared option hedge products for a selected stock, each of said collared option hedge products comprising product features including a put option strike price, a call option strike price, an active time period and a maximum quantity of said selected stock to be sold for said product;

collecting demand for said plurality of collared option hedge products from a plurality of potential customers, said demand including desired product characteristics including a desired put option strike price, a desired call option strike price and a desired time period for said collared option hedge product;

matching said desired product characteristics of said demand with said product features of said collared option hedge products;

allocating, based on said matching step, the collected demand among the plurality of collared option hedge products, including allocating at least some of the plurality of potential customers to each of said plurality of collared option hedge products; and storing the allocation from said allocating step;

wherein the demand includes, for each of the plurality of potential customers, a quantity of stock of each potential customer for investing in a pool in connection with said collared option hedge product.

21. A system for establishing a plurality of derivative financial products, comprising:

means for storing information defining a plurality of collared option hedge products for a selected stock, each of said collared option hedge products comprising product features including a put option strike price, a call option strike price, an active time period and a maximum quantity of said selected stock to be sold for said product;

means for collecting demand for said plurality of collared option hedge products from a plurality of potential customers, said demand including desired product characteristics including a desired put option strike price, a desired call option strike price and a desired time period for said collared option hedge product;

means for matching said desired product characteristics of said demand with said product features of said collared option hedge products;

means for allocating, based on said matching step, the collected demand among the plurality of collared option hedge products, including allocating at least some of the plurality of potential customers to each of said plurality of collared option hedge products; and means for storing the allocation from said allocating step;

wherein the demand includes, for each of the plurality of potential customers, a quantity of stock of each potential customer for investing in a pool in connection with said collared option hedge product.

22. A program product containing a program operable on a computer for establishing a plurality of derivative financial products, said program product comprising instructions for operating said computer to perform the steps of:

storing on said computer information defining a plurality of collared option hedge products for a selected stock, each of said collared option hedge products comprising product features including a put option strike price, a call option strike price, an active time period and a maximum quantity of said selected stock to be sold for said product;

collecting demand for said plurality of collared option hedge products from a plurality of potential customers, said demand including desired product characteristics including a desired put option strike price, a desired call option strike price and a desired time period for said collared option hedge product;

matching said desired product characteristics of said demand with said product features of said collared option hedge products;

allocating, based on said matching step, the collected demand among the plurality of collared option hedge products, including allocating at least some of the plurality of potential customers to each of said plurality of collared option hedge products; and storing the allocation from said allocating step on said computer;

wherein the demand includes, for each of the plurality of potential customers, a quantity of stock of each potential customer for investing in a pool in connection with said collared option hedge product.

\* \* \* \* \*